United States Patent
Castaneda et al.

(10) Patent No.: US 7,425,100 B2
(45) Date of Patent: Sep. 16, 2008

(54) INTEGRATED SELECTIVELY ANGLED CAMERA FOR CLAM STYLE PRODUCTS

(75) Inventors: Julio C. Castaneda, Coral Springs, FL (US); Francis M. Staszesky, Fort Lauderdale, FL (US)

(73) Assignee: Motorola, Inc., Schaumburg, IL (US)

(*) Notice: Subject to any disclaimer, the term of this patent is extended or adjusted under 35 U.S.C. 154(b) by 357 days.

(21) Appl. No.: 11/250,582

(22) Filed: Oct. 6, 2005

(65) Prior Publication Data

US 2007/0081818 A1    Apr. 12, 2007

(51) Int. Cl.
    *G03B 17/04* (2006.01)
(52) U.S. Cl. .................. 396/348; 396/342; 396/350; 455/556.1
(58) Field of Classification Search .......... 396/429, 396/427, 73; 455/556.1, 575.3
    See application file for complete search history.

(56) References Cited

U.S. PATENT DOCUMENTS

| | | | | |
|---|---|---|---|---|
| 4,945,367 A * | 7/1990 | Blackshear | | 396/427 |
| 5,337,220 A | 8/1994 | Granitz | | |
| 5,414,444 A * | 5/1995 | Britz | | 345/156 |
| 6,587,151 B1 * | 7/2003 | Cipolla et al. | | 348/373 |
| 6,856,345 B1 * | 2/2005 | Yamamoto et al. | | 348/207.2 |
| 7,136,672 B2 * | 11/2006 | Kitano et al. | | 455/556.1 |
| 7,210,863 B2 * | 5/2007 | Nakamura | | 396/427 |
| 2004/0189861 A1 * | 9/2004 | Tom | | 348/375 |
| 2004/0228075 A1 | 11/2004 | Moriguchi et al. | | |
| 2004/0252227 A1 | 12/2004 | Seo | | |
| 2005/0001922 A1 | 1/2005 | Lee et al. | | |
| 2005/0014527 A1 * | 1/2005 | Chamber et al. | | 455/556.1 |
| 2005/0054377 A1 | 3/2005 | Yeh | | |

FOREIGN PATENT DOCUMENTS

JP       2004 260732       9/2004

OTHER PUBLICATIONS

Cnet Reviews, "Nokia N800 Internet Tablet" which features a pop-up rotatable camera at the push of a button.*

* cited by examiner

*Primary Examiner*—W. B. Perkey
*Assistant Examiner*—Linda B Smith

(57) ABSTRACT

A clam shell style electronic product (10) includes a base housing portion (12), a flip housing portion (26) pivotably coupled to the base housing portion, a display (28) mounted in the flip housing portion, and a camera (16) in the base housing portion that can be selectively angled to a desired position relative to the display. The camera can be in a position substantially perpendicular to the base housing portion when the camera is locked in a stored position. In the stored position, a camera viewing angle (15) is substantially perpendicular or orthogonal to the base housing portion and not necessarily aligned with a display viewing angle (20) for the display. The camera can rotate to a position substantially perpendicular to a display viewing angle (30) when the flip housing portion is in an open position and the camera is in an unstored (or unlatched or released) position.

20 Claims, 4 Drawing Sheets

40

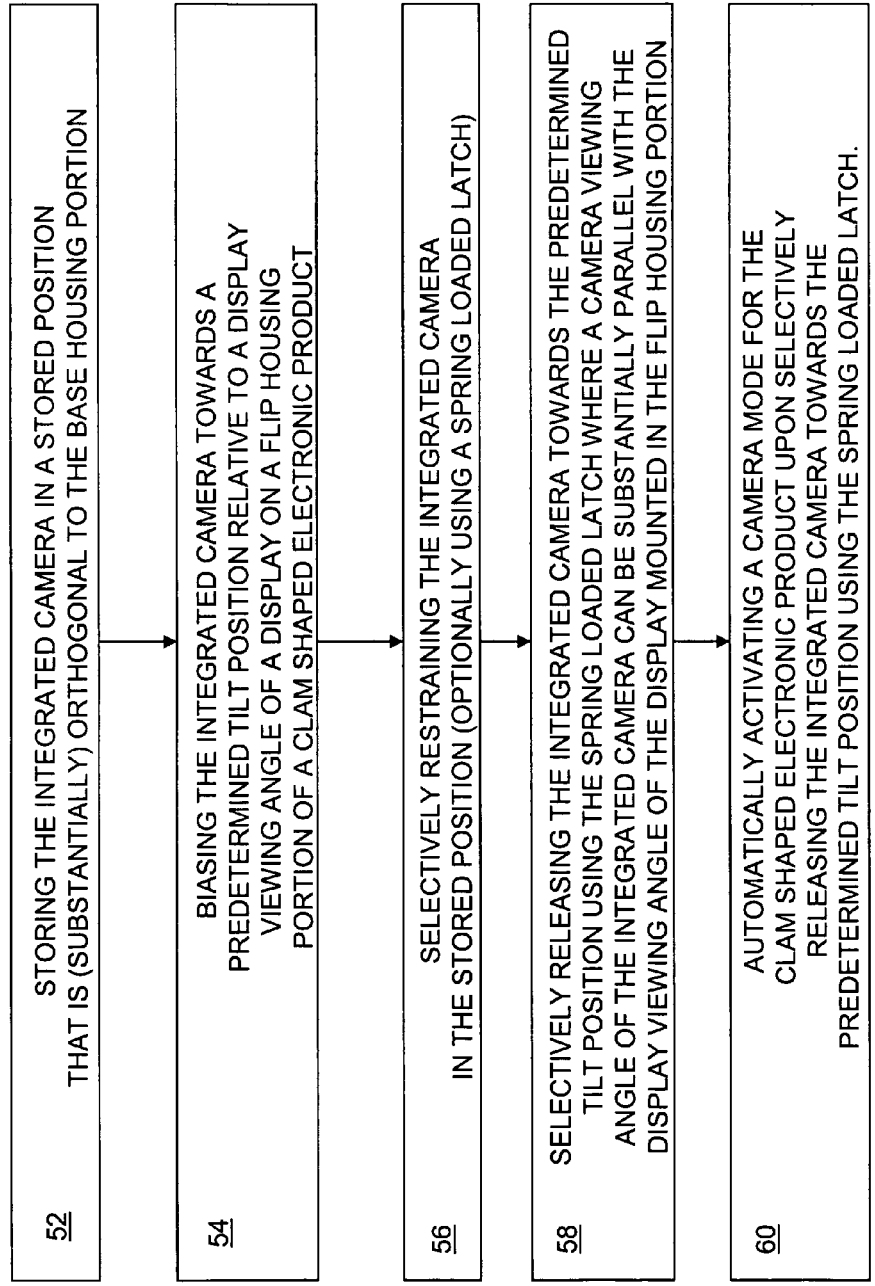

INTEGRATED SELECTIVELY ANGLED CAMERA FOR CLAM STYLE PRODUCTS

FIELD OF THE INVENTION

This invention relates generally to a selectively angled camera, and more particularly to a selectively angled camera integrated in a clam style shaped product.

BACKGROUND OF THE INVENTION

Cameras with higher resolution above 1.3 megapixels (MP) generally have increased thickness due to the optical characteristics of the lens mechanisms, particular camera lenses with auto focus and zoom capabilities. With the size pressures on new products like Motorola, Inc.'s Motorize V3® phone, the flip thickness has been reduced from around 9 to 10 mm three years ago to about 5 to 6 mm today. The thicker higher resolution cameras (that can be 10 to 13 mm thick) no longer fit in the flip housing portions of the phones which was the typical location for the cameras. There are many examples of such camera having the camera in the flip portion such as Motorola's A840 that includes a 1.2 MP camera.

Some phones have avoided this issue by placing the camera in a hinge mechanism of a clam style phone so that they can hide the camera in the base of the phone while making it look like it is on the flip. Since there is more room in the typical base housing of a phone, a phone can utilize this extra volume for the camera so that the size of the flip is not impacted. However, a camera in the base housing portion of the phone would have to be angled in such a way that it is perpendicular to the phone's display to operate effectively. With a display on the (internal) flip housing portion and a camera on a (external) base portion, there would generally be a misalignment problem between the viewing angles of the camera and the corresponding display.

There are several flip phones with pivoting cameras on the hinge of a phone and there are numerous monolith, sliders and rotating display phones with the camera on the base housing portion. However, these phones have the camera perpendicular to the display by the basis of the form factor. There are no known flip phone products with the camera in the base.

SUMMARY OF THE INVENTION

Embodiments in accordance with the present invention can provide a flip or clam shell style electronic product that includes a camera/flash module in a base housing portion that rotates out to a desirable position relative to a display orientation when a flip housing portion is in an open state.

In a first embodiment of the present invention, a clam shell style electronic product can include a base housing portion, a flip housing portion pivotally coupled to the base housing portion, a display mounted in the flip housing portion, and a camera in the base housing portion that is selectively angled to a desired position relative to the display. The electronic product can be a camera phone, a video phone, a video camera, or a laptop computer for example. The camera can be in a position substantially perpendicular to the base housing portion when the camera is locked in a stored position and the camera can move or rotate to a position substantially perpendicular to a display viewing angle when the flip is in an open position and the camera is in an unsorted position. In another alternative, the camera can move or rotate to a position having a camera viewing angle that is substantially in parallel to a display viewing angle when the flip is in an open position and the camera is in an unsorted position. Note, the electronic product can be selectively placed in a camera mode when the camera is spring released from a stored position. In this regard, the electronic product can further include a release button that retains the camera in a stored position in a first position and releases the camera to a desired position when released to a second position. The electronic product can include a spring release for the camera where the camera is spring activated.

The electronic product can further include a camera shield and a pivoting point between the base housing portion and the flip housing portion. The electronic product can further include a linkage between the pivoting point and the camera shield to enable the rotation of the camera with a corresponding rotation of the flip housing portion.

In a second embodiment of the present invention, a clam shell style wireless communication device can include a base housing portion, a flip housing portion pivotally coupled to the base housing portion, a display mounted in the flip housing portion, a camera in the base housing portion that is selectively angled to a desired position relative to the display, and a transceiver within the clam shell style wireless communication device. The device can further include a processor coupled to the transceiver and camera that is programmed to enter a camera mode when the camera is selectively angled to the desired position relative to the display. The processor can be further programmed to remain in a phone mode when the camera is in a stored position. The desired position can be a position where a camera viewing angle of the camera is substantially parallel with a display viewing angle of the display mounted in the flip housing portion. The communication device can further include a camera shield and a pivoting point between the base housing portion and the flip housing portion. In this regard, the communication device can further include a linkage between the pivoting point and the camera shield to enable the rotation of the camera with a corresponding rotation of the flip housing portion. The wireless communication can be a camera phone, a video phone, a video camera, or a laptop computer as examples.

In a third embodiment of the present invention, a method of selectively tilting an integrated camera housed in a base housing portion of a clam shaped electronic product can include the steps of storing the integrated camera in a stored position that is substantially orthogonal to the base housing portion, biasing the integrated camera towards a predetermined tilt position relative to a display viewing angle of a display on a flip housing portion of the clam shaped electronic product, selectively restraining the integrated camera in the stored position using a spring loaded latch, and selectively releasing the integrated camera towards the predetermined tilt position using the spring loaded latch. The step of selectively releasing the integrated camera towards the predetermined tilt position can include the step of releasing the integrated camera towards a tilted position where a camera viewing angle of the integrated camera is substantially parallel with the display viewing angle of the display mounted in the flip housing portion. The method can further include the step of automatically activating a camera mode for the clam shaped electronic product upon selectively releasing the integrated camera towards the predetermined tilt position using the spring loaded latch.

Other embodiments, when configured in accordance with the inventive arrangements disclosed herein, can include a system for performing and a machine readable storage for causing a machine to perform the various processes and methods disclosed herein. The terms "program," "software application," and the like as used herein, are defined as a sequence of instructions designed for execution on a computer system. A program, computer program, or software application may include a subroutine, a function, a procedure, an object method, an object implementation, an executable application, an applet, a served, a source code, an object code, a shared library/dynamic load library and/or other sequence of instructions designed for execution on a computer system.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely.

BRIEF DESCRIPTION OF THE DRAWINGS

FIG. 4 is a flow chart illustrating a method of selectively tilting an integrated camera housed in a base housing portion of a clam shaped electronic product in accordance with an embodiment of the present invention.

DETAILED DESCRIPTION OF THE DRAWINGS

Figure 1:
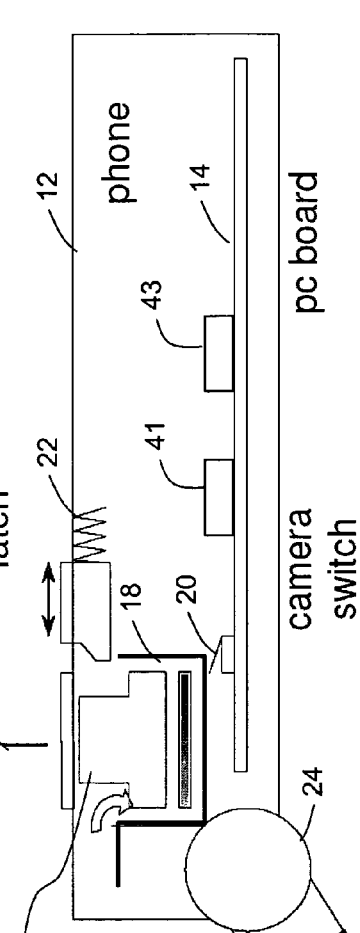
FIG. 1 is a side view illustration of a camera phone having an integrated camera in a stored position within a base housing portion in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Figure 2:
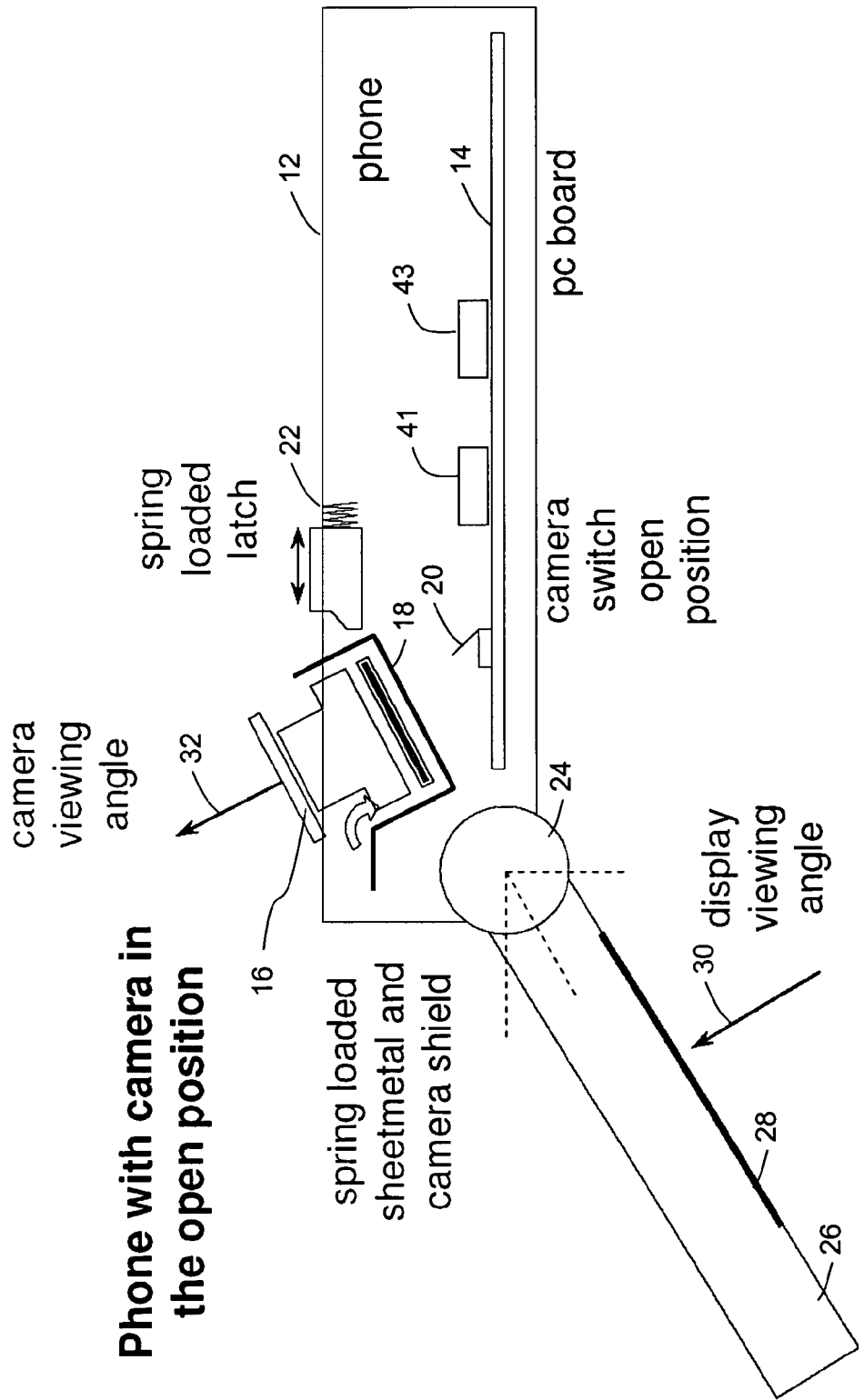
FIG. 2 is another side view illustration of the camera phone of FIG. 1 having the integrated camera in an open position that is tilted in a predetermined position in accordance with an embodiment of the present invention.

Referring to FIGS. 1 and 2, a clam shell style electronic product 10 such as a wireless communication product is shown including an integrated camera and/or flash module 16 that can be embedded into a base housing portion 12 of the electronic product 10. The camera or camera module 16 can spring out to a position that is perpendicular to a display 28 on a flip housing portion 26 when the flip housing portion is in a predetermined open angle and when a latch mechanism 22 is released or unlatched. A spring mechanism can be incorporated into a camera shielding can 18. There can optionally or alternatively be a biasing mechanism and/or switch 20 to detect the open-closed position of the camera 16 which enable the latch to be used as a button and to put the phone into camera/video mode. The switch and/or biasing mechanism 20 can be mounted on a printed circuit board 14. By allowing the camera 16 (and flash) to spring into the open position and "disappearing" or substantially disappearing into the base housing portion 12 when not in use, an overall streamlined industrial design for the electronic product is maintained without jeopardizing functionality.

Referring once again to FIG. 1, the clam shell style electronic product 10 can include the base housing portion 12, the flip housing portion 26 pivotally coupled to the base housing portion 12, the display 28 mounted in the flip housing portion 26, and the camera 16 in the base housing portion that can be selectively angled to a desired position relative to the display 28. Note, the electronic product 10 can be a camera phone, a video phone, a video camera, or a laptop computer for example. The camera 10 can be in a position substantially perpendicular to the base housing portion when the camera is locked in a stored position as shown in FIG. 1. Note, in the stored position, the camera viewing angle 15 is substantially perpendicular or orthogonal to the base housing portion 12 and not necessarily aligned with a display viewing angle 30 for the display 28 on the flip housing portion 26. Referring to FIG. 2, the camera 16 can rotate to a position substantially perpendicular to the display viewing angle 30 when the flip housing portion 26 is in an open position and the camera 16 is in an unsorted (or unlatched or released) position. In another way of describing this arrangement, the camera 16 can rotate to a position having a camera viewing angle 32 that is substantially in parallel to a display viewing angle 30 when the flip housing portion 26 is in an open position and the camera 16 is in an unsorted (or unlatched or released) position. Note, the electronic product 10 can be selectively placed in a camera mode when the camera is spring released from a stored position. In this regard, the electronic product 10 can further include the release button or spring loaded latch 22 that retains the camera in a stored position in a first position as shown in FIG. 1 and releases the camera to a desired position when released to a second position as shown in FIG. 2. The electronic product 10, in other words, can include a spring release for the camera 16 where the camera is spring activated.

Figure 3:
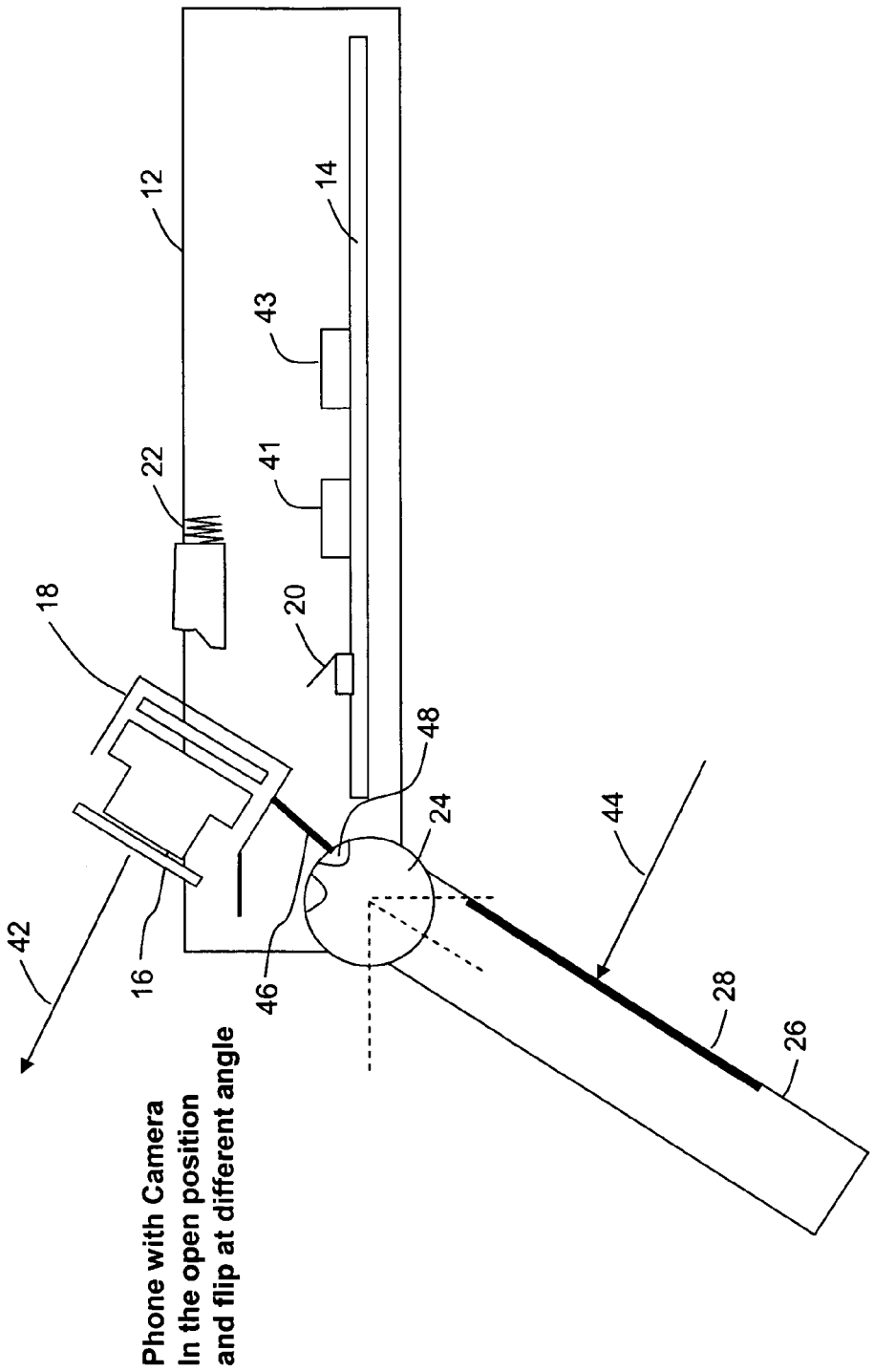
FIG. 3 is a side view illustration of another camera phone having the integrated camera in an open and tilting position that further selectively moves in relation to the flip housing portion in accordance with an embodiment of the present invention.

The electronic product 10 can further include a camera shield 18 and a pivoting point 24 between the base housing portion and the flip housing portion. With further reference to FIG. 3, an electronic product 40 similar to electronic product 10 of FIGS. 1 and 2 can further include a linkage 46 between the pivoting point 24 and the camera shield 18 to enable the rotation of the camera 16 with a corresponding rotation of the flip housing portion 26. Note that the flip housing portion 26 is in a "more closed" position and has a display viewing angle of 44. The linkage 46, in conjunction with detents 48 on the pivot point 24 can be used to further bias the camera 16 to tilt or angle to a position that would substantially remain perpendicular to the display viewing angle 44 as the flip housing portion 26 is rotated about the pivot point 24 relative to the base housing portion 12. In other words, the camera viewing angle 42 would be parallel or aligned with the display viewing angle 44. Although a couple of detents and a single linkage are shown, further detents and linkages can be used to provide a greater range of alignment. Otherwise, the alignment will generally occur at one predetermined angle as illustrated in the embodiment of FIG. 2.

The electronic product 10 or 40 can also be embodied as a clam shell style wireless communication device and further include a transceiver 41 within the device 40. The device 10 or 40 can further include a processor 43 coupled to the transceiver 41 and camera 16 that can be programmed to enter a camera mode when the camera is selectively angled to the desired position relative to the display as shown in FIGS. 2 and 3. The processor 43 can be further programmed to remain in a phone mode when the camera is in a stored position as shown in FIG. 1

Referring to FIG. 4, a flow chart illustrating a method 50 of selectively tilting an integrated camera housed in a base housing portion of a clam shaped electronic product is shown. The method 50 can include the step 52 of storing the integrated camera in a stored position that is substantially orthogonal to the base housing portion, biasing the integrated camera towards a predetermined tilt position relative to a display viewing angle of a display on a flip housing portion of the clam shaped electronic product at step 54, selectively restraining the integrated camera in the stored position using a spring loaded latch at step 56, and selectively releasing the integrated camera towards the predetermined tilt position using the spring loaded latch at step 58. The step of selectively releasing the integrated camera towards the predetermined tilt position can include the step of releasing the integrated camera towards a tilted position where a camera viewing angle of the integrated camera is substantially parallel with the display viewing angle of the display mounted in the flip housing portion. The method 50 can further include the step 60 of automatically activating a camera mode for the clam shaped electronic product upon selectively releasing the integrated camera towards the predetermined tilt position using the spring loaded latch.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A clam shell style electronic product, comprising:
   a base housing portion;
   a flip housing portion pivotably coupled to the base housing portion;
   a display mounted in the flip housing portion; and
   a camera in the base housing portion that is selectively angled automatically to a desired position relative to the display as the flip housing portion pivots.

2. The clam shell style electronic product of claim 1, wherein the electronic product is a camera phone, a video phone, a video camera, or a laptop computer.

3. The clam shell style electronic product of claim 1, wherein the camera is in a position substantially perpendicular to the base housing portion when the camera is locked in a stored position.

4. The clam shell style electronic product of claim 1, wherein the camera correspondingly moves to a position substantially perpendicular to a display viewing angle when the flip housing portion is in an open position and the camera is in an unstored position.

5. The clam shell style electronic product of claim 1, wherein the electronic product is selectively placed in a camera mode when the camera is spring released from a stored position.

6. The clam shell style electronic product of claim 1, wherein the electronic product further comprises a release button that retains the camera in a stored position in a first position and releases the camera to a desired position when released to a second position.

7. The clam shell style electronic product of claim 1, wherein the electronic product further comprises a spring release for the camera and wherein the camera is spring activated.

8. The clam shell style electronic product of claim 1, wherein the camera moves to a position having a camera viewing angle that is substantially in parallel to a display viewing angle as the flip housing portion is being open and when the flip housing portion is in an open position and the camera is in an unstored position.

9. The clam shell style electronic product of claim 1, wherein the electronic product further comprises a camera shield and a pivoting point between the base housing portion and the flip housing portion.

10. The clam shell style electronic product of claim 9, wherein the electronic product further comprises a linkage between the pivoting point and the camera shield to enable a rotation of the camera with a corresponding rotation of the flip housing portion.

11. A clam shell style wireless communication device, comprising:
    a base housing portion;
    a flip housing portion pivotably coupled to the base housing portion;
    a display mounted in the flip housing portion;
    a camera in the base housing portion that is selectively angled to a desired position relative to the display as the flip housing portion pivots; and
    a transceiver within the clam shell style wireless communication device.

12. The clam shell style wireless communication device of claim 11, wherein the device further comprises a processor coupled to the transceiver and a camera and is programmed to enter a camera mode when the camera is selectively angled to the desired position relative to the display.

13. The clam shell style wireless communication device of claim 12, wherein the desired position is a position where a camera viewing angle of the camera is substantially parallel with a display viewing angle of the display mounted in the flip housing portion.

14. The clam shell style wireless communication device of claim 11, wherein the device further comprises a processor coupled to the transceiver and a camera and is programmed to remain in a phone mode when the camera is in a stored position.

15. The clam shell style wireless communication device of claim 11, wherein the communication device further comprises a camera shield and a pivoting point between the base housing portion and the flip housing portion and wherein the camera in the base housing portion faces an opposing direction to the display when the flip housing portion is in an open position.

16. The clam shell style wireless communication device of claim 15, wherein the communication device further comprises a linkage between the pivoting point and the camera shield to enable a rotation of the camera with a corresponding rotation of the flip housing portion.

17. The clam shell style wireless communication device of claim 11, wherein the wireless communication device is a camera phone, a video phone, a video camera, or a laptop computer.

18. A method of selectively tilting an integrated camera housed in a base housing portion of a clam shaped electronic product, comprising the steps of:
- storing the integrated camera in a stored position that is substantially orthogonal to the base housing portion;
- biasing the integrated camera towards a predetermined tilt position relative to a display viewing angle of a display on a flip housing portion of the clam shaped electronic product;
- selectively restraining the integrated camera in the stored position; and
- selectively releasing the integrated camera to enable the integrated camera to automatically set to the predetermined tilt position.

19. The method of claim 18, wherein the step of selectively releasing the integrated camera towards the predetermined tilt position comprises releasing the integrated camera towards a tilted position where a camera viewing angle of the integrated camera is substantially parallel with the display viewing angle of the display mounted in the flip housing portion.

20. The method of claim 18, wherein the camera is selectively restrained and selectively released using a spring loaded latch and the method further comprises the step of automatically activating a camera mode for the clam shaped electronic product upon selectively releasing the integrated camera towards the predetermined tilt position using the spring loaded latch.

* * * * *